United States Patent
Lockhart et al.

(10) Patent No.: US 10,016,726 B2
(45) Date of Patent: Jul. 10, 2018

(54) PURIFICATION PROCESS FOR PARTLY-HYDROLYZED CELLULOSE

(71) Applicant: NORAM Engineering and Constructors Ltd., Vancouver (CA)

(72) Inventors: James M. Lockhart, Vancouver (CA); Peter G. Symons, Williamsville, NY (US); J. David Genders, Elma, NY (US)

(73) Assignee: NORAM Engineering and Constructors Ltd., Vancouver (CA)

( * ) Notice: Subject to any disclaimer, the term of this patent is extended or adjusted under 35 U.S.C. 154(b) by 72 days.

(21) Appl. No.: 15/122,027

(22) PCT Filed: Feb. 28, 2014

(86) PCT No.: PCT/CA2014/050156
§ 371 (c)(1),
(2) Date: Aug. 26, 2016

(87) PCT Pub. No.: WO2015/127531
PCT Pub. Date: Sep. 3, 2015

(65) Prior Publication Data
US 2017/0014771 A1    Jan. 19, 2017

(51) Int. Cl.
*B01D 61/42*    (2006.01)
(52) U.S. Cl.
CPC .................. *B01D 61/422* (2013.01)
(58) Field of Classification Search
CPC ..... B01D 61/422; B01D 61/44; B01D 61/445
See application file for complete search history.

(56) References Cited

U.S. PATENT DOCUMENTS

| 3,369,906 A | 2/1968 | Chen |
| 4,124,471 A | 11/1978 | Lieb et al. |

(Continued)

FOREIGN PATENT DOCUMENTS

| CA | 2157394 | 9/1994 |
| JP | 2514389 | 7/1996 |

(Continued)

OTHER PUBLICATIONS

Kim et al., "Anaerobic Digestion and Acid Hydrolysis of Nitrocellulose," CERL Technical Report 99/45, 1999.

(Continued)

*Primary Examiner* — Arun S Phasge
(74) *Attorney, Agent, or Firm* — Walter | Haverfield LLP; D. Peter Hochberg; Sean F. Mellino

(57) ABSTRACT

A method of recovering purified partly-hydrolyzed cellulose particles from a composition comprising agglomerated partly-hydrolyzed cellulose particles and an acid, using electrodialysis. The invention addresses the problem of reducing the acid to very low levels while avoiding the high capital and operating costs, high water usage and large filtration surface area or dilution time requirements of the prior art processes. Following dilution, concentration by centrifuging or settling, and/or dialysis of the composition, the composition is treated in an electrodialysis cell to remove ions, such as free sulfate from sulfuric acid. The method may include having an anion exchange resin in the feed compartment of the electrodialysis cell, adding a base to the receiving solution in the electrodialysis cell, and a second step of electrodialysis of the purified partly-hydrolyzed cellulose particles.

24 Claims, 13 Drawing Sheets

(56) References Cited

U.S. PATENT DOCUMENTS

| | | | |
|---|---|---|---|
| 5,244,553 | A | 9/1993 | Goldstein |
| 5,629,055 | A | 5/1997 | Revol et al. |
| 5,759,251 | A | 6/1998 | Nakamura et al. |
| 5,788,815 | A | 8/1998 | Norell et al. |
| 7,175,869 | B2 | 2/2007 | Brown et al. |
| 7,582,326 | B2 | 9/2009 | Brown et al. |
| 8,247,203 | B2 | 8/2012 | Foody et al. |
| 8,568,565 | B2 | 10/2013 | Tokarz et al. |
| 2006/0024413 | A1 | 2/2006 | Crowley |
| 2012/0065389 | A1* | 3/2012 | Miyawaki ............ B01J 31/0235 536/57 |

FOREIGN PATENT DOCUMENTS

| | | |
|---|---|---|
| JP | 2011157225 A | 8/2011 |
| JP | 2011168651 A | 9/2011 |
| JP | 2012183031 A | 9/2012 |
| WO | 2010/116794 A1 | 10/2010 |
| WO | WO2012/064868 | 5/2012 |
| WO | 2014029001 A1 | 2/2014 |

OTHER PUBLICATIONS

Goldstein et al., "Acid Recovery by Electrodialysis and Its Economic Implications for Concentrated Acid Hydrolysis of Wood," The Humana Press Inc., 1989.

Jean-Francois Revol et al., "Chiral nematic suspensions of cellulose crystallites; phase separation and magnetic field orientation," Liquid Crystals,1994, V. 16, No. 1,127-134.

Xue Min Dong et al., "Effects of Ionic Strength on the Isotropic-Chiral Nematic Phase Transition of Suspensions of Cellulose Crystallites," Langmuir, 1996, vol. 12, 2076-2082.

Tiffany Abitbol et al., "Estimation of the surface sulfur content of cellulose nanocrystals prepared by sulfuric acid hydrolysis," Cellulose, 2013, 20: 785-794.

International Preliminary Report on Patentability, PCT/CA2014/050156, dated Sep. 6, 2016.

Sanaa Pirani et al. "Nanocrystalline cellulose extraction process and utilization of the byproduct for biofuels production" Carbohydrate Polymers, 2012, vol. 93 (2013), pp. 357-363.

* cited by examiner

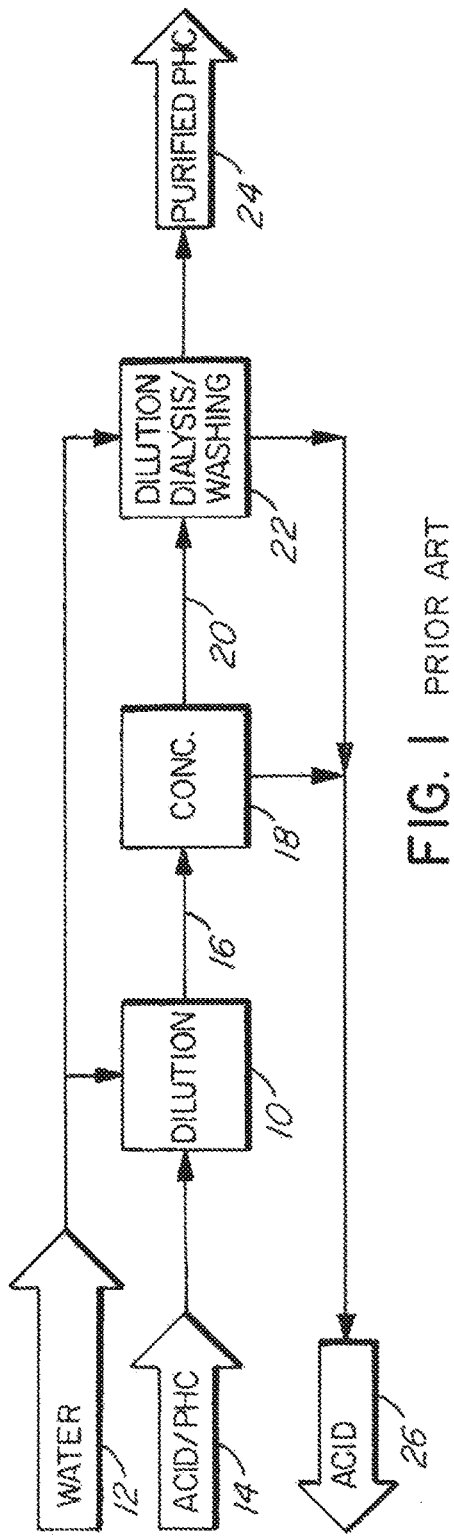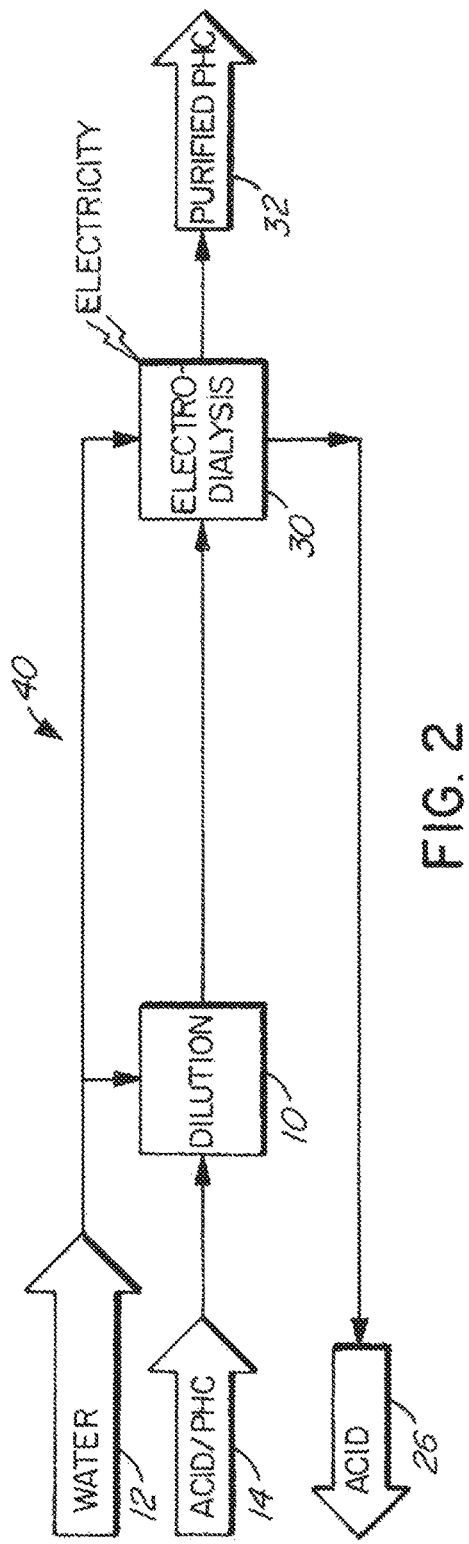

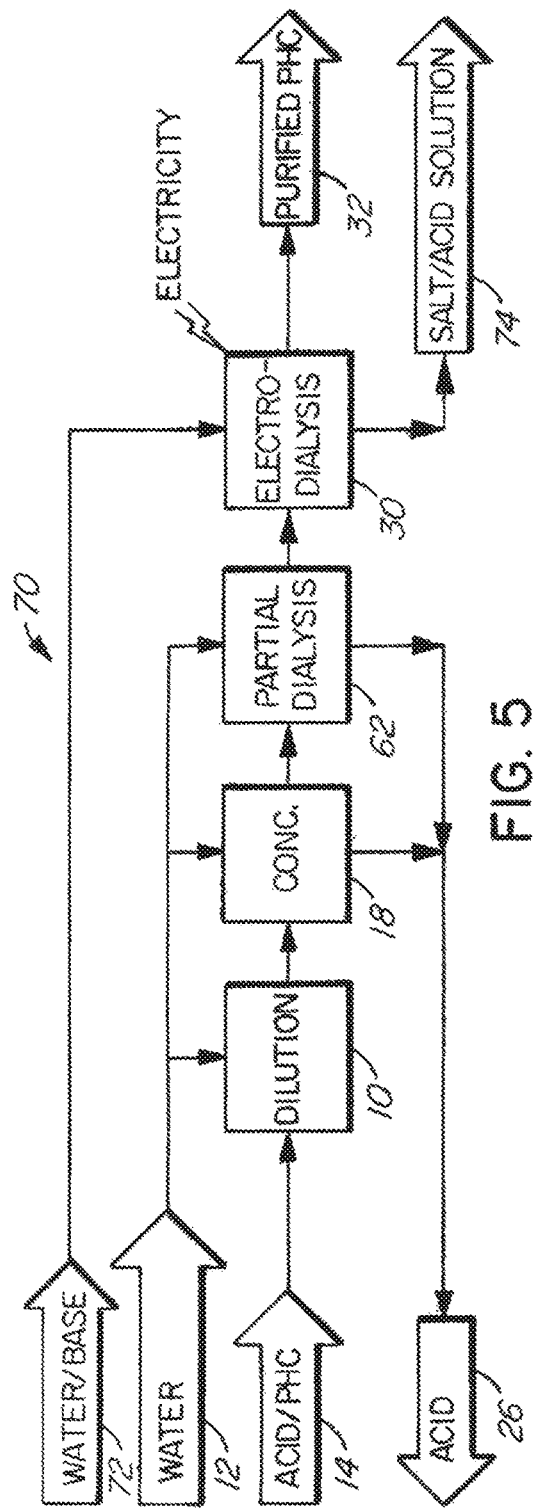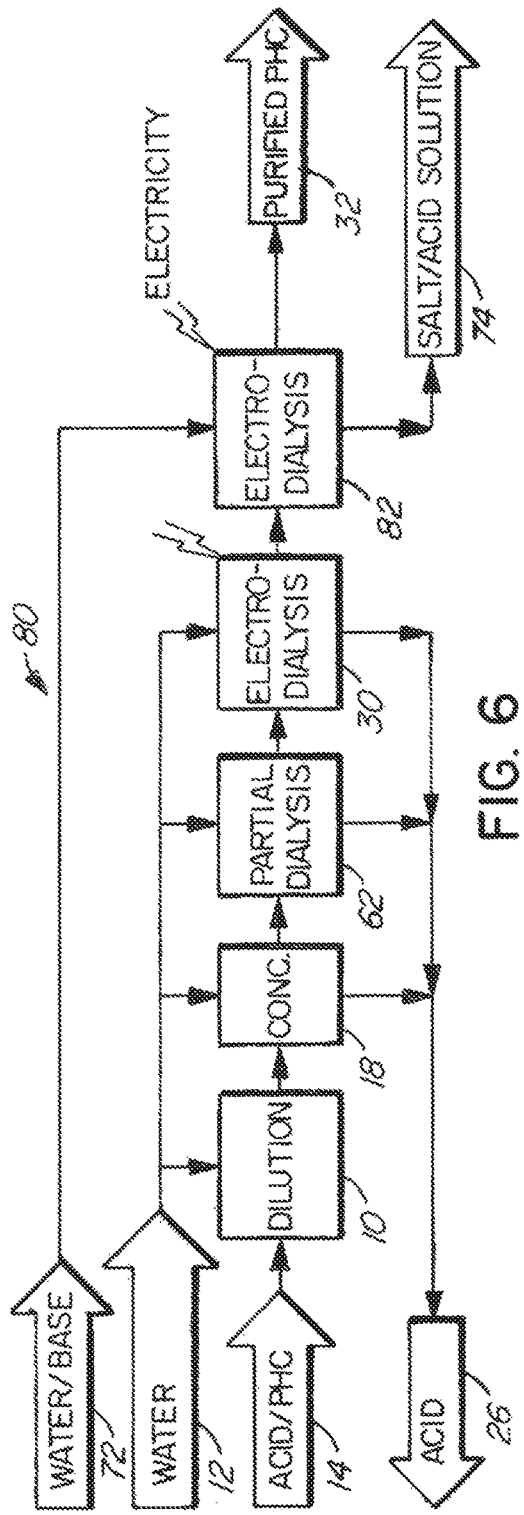

PURIFICATION PROCESS FOR PARTLY-HYDROLYZED CELLULOSE

CROSS REFERENCE TO RELATED APPLICATIONS

This application is a 371 National State application of International Application No. PCT/CA2014/050156 filed on Feb. 28, 2014, which is incorporated herein by reference in its entirety.

FIELD OF THE INVENTION

The invention pertains to processes for washing partly-hydrolyzed cellulose to remove acid to low levels.

BACKGROUND OF THE INVENTION

Partly-hydrolyzed cellulose (also referred to in the literature as cellulose crystallites or nanocrystalline cellulose) is most commonly produced by the controlled acid hydrolysis of cellulose using sulfuric acid. The cellulose may be from various sources, including wood pulp and cotton. The less dense amorphous regions along the cellulose microfibril are more susceptible to acid attack during hydrolysis and cleave to give the partly-hydrolyzed cellulose. Acids other than sulfuric, such as hydrochloric acid, phosphoric acid, etc., or mixtures of acids, may be used. For simplicity of explanation, the following discussion focuses on the use of sulfuric acid and the removal of sulfate.

At high ionic strengths, such as that caused by the residual sulfuric acid from hydrolysis, the individual nano-particles of crystalline cellulose tend to agglomerate together into larger particles which settle and concentrate under gravity, or in a centrifuge. To obtain the desired discrete nano-particles, the ionic strength of the solution must be reduced to very low levels. To achieve this desired purification, one or more steps of dilution followed by concentration are typically employed to separate the bulk of the sulfuric acid (about 90%) from the partly-hydrolyzed cellulose; however, as the acid concentration and associated ionic strength decrease, the partly-hydrolyzed cellulose particles deagglomerate into smaller aggregates to a point where they no longer separate efficiently by gravity or centrifugation and alternative methods must be employed to further reduce the acid concentration.

To achieve the desired final purity of the partly-hydrolyzed cellulose suspension, a very fine filter which retains the partly-hydrolyzed cellulose particles combined with continuous or step-wise water washing is typically employed. This washing step is often referred to in the literature as dialysis or diafiltration, it typically employs an ultrafiltration membrane-based filter with a retention of about 200,000 Daltons or less. Although a significant portion of the starting acid has usually been removed previously as discussed above, concentrations must be further reduced by several orders of magnitude so that acid does not affect end-use properties of the cellulose product. Even with a highly efficient dialysis system, very large filtration surface areas and flow rates or dilution times are required relative to the quantity of partly-hydrolyzed cellulose produced.

While generally improving overall viability, decantation or centrifugation is not strictly required as an initial purification step. The desired final purity can be achieved using dialysis alone; however, this increases dialysis washing requirements and acid recovery costs significantly.

The above process steps which have been employed to produce partly-hydrolyzed cellulose are described in: (1) U.S. Pat. No. 5,629,055 to Revol et al.; (2). Jean-François Revol, Louis Godbout, Xue-Min Dong, Derek G. Gray, Henri Chanzy, and Georg Maret, "Chiral nematic suspensions of cellulose crystallites; phase separation and magnetic field orientation," *Liquid Crystals*, (1994) Vol, 16, No. 1: 127; and (3) Xue Min Dong, Tsunehisa Kimura, Jean-François Revol, and Derek G. Gray, "Effects of Ionic Strength on the Isotropic-Chiral Nematic Phase Transition of Suspensions of Cellulose Crystallites," *Langmuir*, (1996) Vol. 12: 2076. U.S. Pat. No. 5,629,055 also discloses the use of a mixed bed ion exchange system as a polishing step following dialysis. This is further discussed in (4) Tiffany Abitbol, Elisabeth Kloser, Derek G. Gray, "Estimation of the surface sulfur content of cellulose nanocrystals prepared by sulfuric acid hydrolysis," *Cellulose*, (2013) 20; 785-794.

The prior art dialysis purification process described above also removes sugars produced in hydrolysis as well as other soluble impurities; however, these are typically present in lower quantities than the sulfuric acid such that their removal is not normally the limiting factor in the purification of partly-hydrolyzed cellulose.

SUMMARY OF THE INVENTION

The invention provides a method for removing acid from a composition containing partly-hydrolyzed cellulose particles, that is, for recovering purified partly-hydrolyzed cellulose from a composition comprising partly-hydrolyzed cellulose and acid. The invention reduces the requirements for high capital and operating costs, water usage and large filtration surface areas typical of the prior art processes.

According to one aspect of the invention, there is provided a method of recovering purified partly-hydrolyzed cellulose particles from a composition comprising agglomerated partly-hydrolyzed cellulose particles and free ions, comprising electrodialysis of the composition to produce a stream comprising purified partly-hydrolyzed cellulose particles. The method includes pre-treatment of the composition before the electrodialysis to reduce the concentration of the free ions. The free ions may comprise an acid. According to some aspects of the invention, the acid is neutralized by the addition of a base prior to the electrodialysis. In this context, "neutralized" can indicate either partial neutralization which creates an acid and salt mixture, or full neutralization leaving only a salt.

It is known to use electrodialysis for the de-ionization of water and of solutions containing non-charged dissolved species, such as proteins. However, it has not previously been known in the art that electrodialysis can affectively be used to remove acid from compositions of partly-hydrolyzed cellulose. Moreover, it is generally understood that to prevent membrane fouling in electrodialysis it is necessary to first remove particulate greater than 1 micron in size from the feed stream to very low concentrations, it is thus surprising that electrodialysis can be used to treat agglomerated partly-hydrolyzed cellulose particles with an effective size far greater than that and at relatively high concentrations without incurring significant membrane fouling and other issues.

Further aspects of the invention and features of specific embodiments are described below.

BRIEF DESCRIPTION OF THE DRAWINGS

FIG. 1 is a schematic diagram of a prior art process for removing sulfuric acid from a composition comprising partly-hydrolyzed cellulose particles and sulfuric acid.

FIG. 2 is a schematic diagram of one embodiment of a process according to the invention for purifying partly-hydrolyzed cellulose using electrodialysis.

FIG. 5 is a schematic diagram of a fourth embodiment of the purification process, incorporating the addition of a base to the receiving solution of the electrodialysis cell.

FIG. 6 is a schematic diagram of a fifth embodiment of the purification process, incorporating staged electrodialysis.

DETAILED DESCRIPTION OF THE PREFERRED EMBODIMENT

Figure 3:
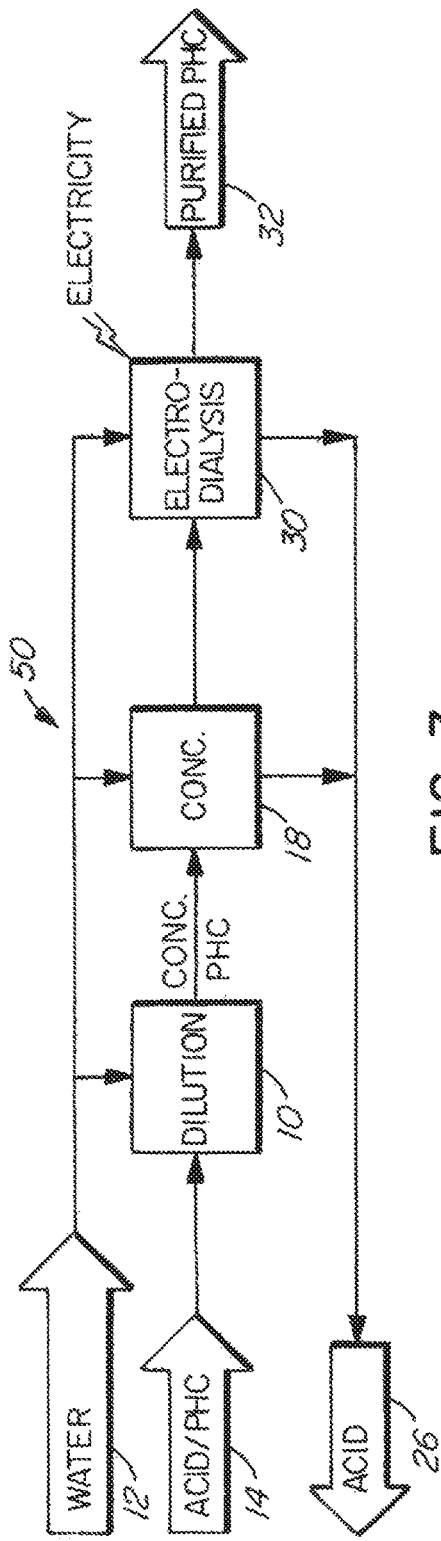
FIG. 3 is a schematic diagram of a second embodiment of the purification process, incorporating upstream acid removal by settling or centrifugation.

In the following description and in the drawings, corresponding and like elements are identified by the same reference characters.

Compositions comprising partly-hydrolyzed cellulose particles and sulfuric acid may be prepared according to methods well-known in the art, i.e. by the hydrolysis of natural cellulosic materials such as wood pulp. Typically, finely-ground bleached chemical pulp is reacted with sulfuric acid at an elevated temperature and with continuous mixing. After the hydrolysis is completed to the extent required, the mixture is quenched with water or dilute acid. The resulting composition is typically in the form of a suspension, solution, colloid or gel.

A prior art process for removing sulfuric acid from a composition comprising partly-hydrolyzed cellulose and sulfuric acid is depicted in FIG. 1. A dilution step 10 is done by adding a stream of water 12 to the composition 14 of partly-hydrolyzed cellulose (PHC) and sulfuric acid. The dilution may also be done with a stream of dilute acid, e.g. sulfuric acid of less than 20 wt. %, recovered from elsewhere in the plant. The diluted composition 16 is subjected to centrifugation 18. These two steps may be repeated as required. Following centrifugation, the concentrated partly-hydrolyzed cellulose composition 20 is subjected to dialysis 22. The dialysis step may be done by means of continuous or step-wise addition of water, or by batch washing. The dialysis produces the purified partly-hydrolyzed cellulose 24. Both the dialysis step 22 and the centrifugation step 18 produce a stream of waste acid 26, as sulfuric acid is removed from the composition.

Although sulfuric acid is commonly the acid used to prepare partly-hydrolyzed cellulose, as mentioned above, other acids such as hydrochloric acid, nitric acid and phosphoric acid, and mixtures of acids, may be used. The present invention for purifying partly-hydrolyzed cellulose applies generally to the partly-hydrolyzed cellulose-acid mixtures resulting from such operations. In the description below, the method of the invention is described for the case in which the acid in the partly-hydrolyzed cellulose-acid mixture is sulfuric acid, as one example of the mixtures to which the invention may be applied. In other embodiments, the acid is hydrochloric acid, nitric acid or phosphoric acid, or a mixture of acids.

The method of the invention uses an electrodialysis step as an efficient means of removing free sulfate and other ions from partly-hydrolyzed cellulose particle suspensions. Unlike the prior art dilution and dialysis process used for partly-hydrolyzed cellulose purification, electrodialysis uses an electric field to increase the removal rate of ions, primarily free sulfate, from the solution without requiring significant quantities of water for dilution or washing purposes. A major challenge anticipated was the potential plugging of narrow channels (about (15 mm) and membrane fouling with partly-hydrolyzed cellulose particles; however, surprisingly this was not found to be a problem. Further, the process can accommodate compositions having high levels of suspended solids, for example greater than 1,000 mg/L, or greater than 6,000 mg/L Where the composition comprising partly-hydrolyzed cellulose and acid to be treated by the electrodialysis method of the invention has not already been diluted and/or dialyzed, then one or more of such pre-treatment steps may first be conducted in order to reduce the acid concentration. The embodiments of the invention illustrated in FIGS. 2 to 6 include various exemplary combinations of one or more such pre-treatment steps.

Referring to FIG. 2, which illustrates one embodiment of the process 40 of the invention, the concentrated acid and partly-hydrolyzed cellulose 14 are first diluted 10 with water or dilute acid 12 and then all of the acid is removed by electrodialysis 30, resulting in a stream of purified partly-hydrolyzed cellulose 32 and a stream of waste sulfuric acid 26.

Figure 7:
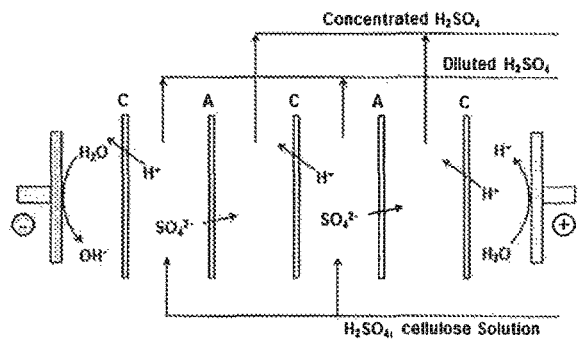
FIG. 7 is a schematic diagram of an electrodialysis cell configuration using cation and anion membranes.
Figure 11:
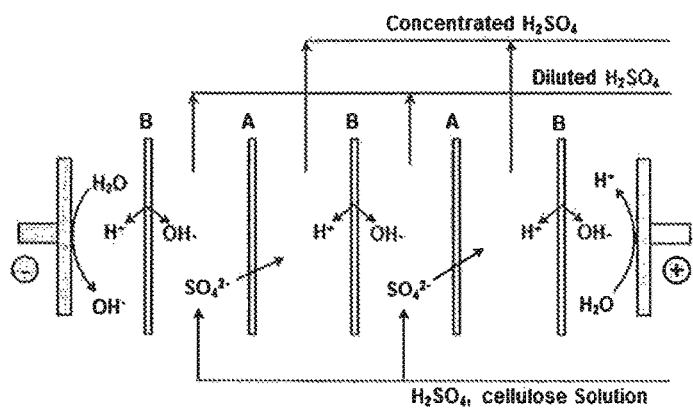
FIG. 11 is a schematic diagram of an electrodialysis cell configuration using bipolar and anion membranes.

The electrodialysis step 30 comprises an electrochemical cell stack divided into alternating compartments of feed solution and receiving solution separated by anion-specific membranes and cation-specific or bi-polar membranes which retain the partly-hydrolyzed cellulose particles themselves. Free bisulfate and sulfate ions pass from the feed solution compartment through an anion-specific membrane into a receiving solution compartment where they are joined by cations, thus recreating the ionic species removed from the feed compartment and maintaining charge balance. The cations for this are obtained either from another feed compartment and passing through a cation specific membrane or, in case of acid removal where the cations are protons, may be produced electrochemically by splitting water at the surface of a bi-polar membrane. In the case of a bi-polar membrane, hydroxide is produced on the feed compartment side of the membrane and combines with protons there to form water and maintain charge neutrality. FIG. 7 schematically depicts an electrodialysis cell configuration having anion-specific membranes A and cation-specific membranes C. FIG. 11 schematically depicts an electrodialysis cell configuration having bi-polar membranes B and anion-specific membranes A.

By alternating the feed and receiving compartments, anions moving in one direction and cations moving in the other across alternating membranes achieve a continuous flow of ions and charge through the stack. At either end it is necessary to balance the charge in a different way; this may be done by splitting water to produce oxygen and protons on one end and hydrogen and hydroxide on the other.

FIG. 3 depicts a further embodiment of the process 50, where one or more steps of staged dilution 10 and concentration 18, such as by centrifugation or settling, are utilized upstream of the electrodialysis 30 to reduce the acid concentration prior to employing the electrodialysis.

Figure 4:
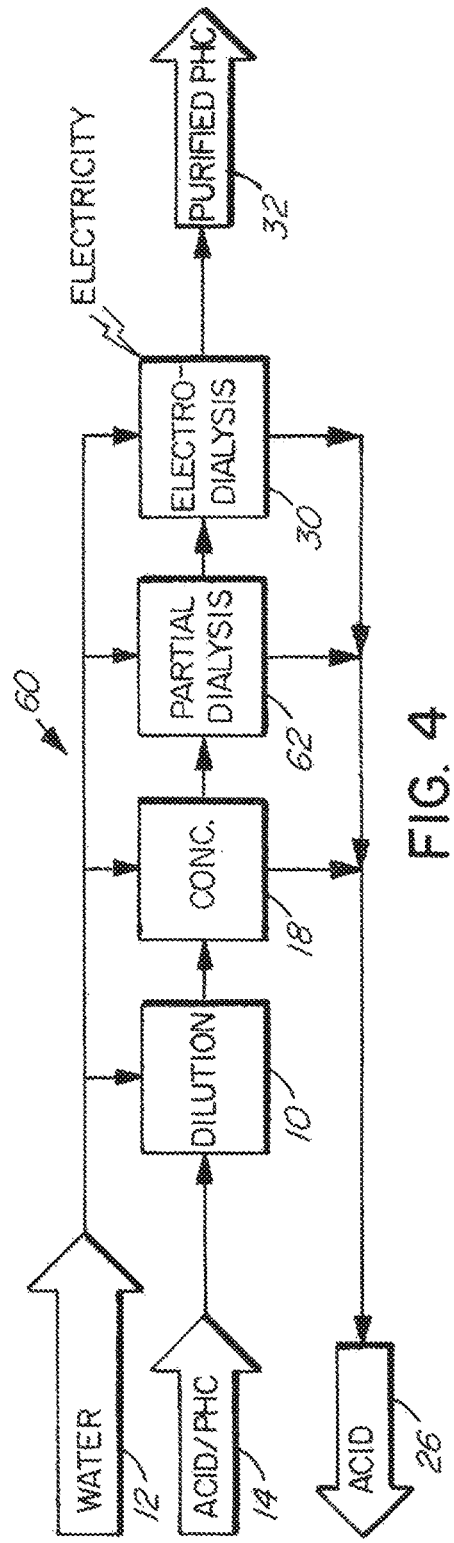
FIG. 4 is a schematic diagram of a third embodiment of the purification process, incorporating upstream acid removal by settling or centrifugation and partial dialysis.

FIG. 4 depicts a further embodiment of the process 60, which is enhanced, relative to the process 50 of FIG. 3, by the addition of a step of partial purification using dilution washing dialysis 62 prior to the final purification by electrodialysis 30.

FIG. 5 depicts a further embodiment of the process 70, which is enhanced, relative to the process 60 of FIG. 4, by the addition of a base to the receiving solution of the electrodialysis cell. When free sulfate levels are brought down to very low levels in the feed solution of the electrodialysis cell, a significant amount of proton back migration occurs from the dilute acid receiving solution, reducing the current efficiency. To reduce this back migration, a base 72, such as NaOH, is added to the receiving solution to neutralize the dilute acid and produce a neutral salt or partially neutralized acid and salt mixture 74. Since sodium and other cations have much lower migration rates through anion membranes than protons, the overall current efficiency can be significantly improved, reducing both electricity and area requirements for the system. The optimal base addition and corresponding receiving fluid pH will vary by installation depending on the relative cost of acid, base and electricity, effluent neutralization requirements and the system's capital cost; however, it is believed that the optimal pH would typically lie between 1 and 3 in most situations.

FIG. 6 depicts a further embodiment 80 of the process, which is enhanced, relative to the process 70 of FIG. 5, by using more than one stage of electrodialysis, i.e. a first stage 30 and a second stage 82. The current density and current efficiency in electrodialysis both decrease as the free sulfate levels in the feed solution decrease. Since the current density and efficiency decrease most significantly only after the majority of the free sulfate has been removed, it can be advantageous to perform the bulk and final separations under different sets of conditions.

In some embodiments of the method 20, 50, 60, 70, 80, an anionic resin is placed in the feed compartments of the electrodialysis cell, the cell having either an anion-bipolar membrane configuration or an anion-cation membrane configuration. This increases the feed conductivity and sulfate transfer rate, especially at low free sulfate levels.

In some embodiments of the method of the invention, the acid in the composition of partly-hydrolyzed cellulose particles and acid is neutralized prior to electrodialysis. This can be done at any desired stage of the process by the addition of base, for example prior to any dilution or dialysis, or immediately before electrodialysis by adding the base to the feed compartment of the electrodialysis cell. The neutralized composition is then processed in accordance with the methods described above, resulting in the purified partly-hydrolyzed cellulose particles and a waste stream of salt solution rather than an acid.

EXAMPLES

A suspension of partly-hydrolyzed cellulose particles in sulfuric acid was produced as follows. 115 g of finely ground Kraft pulp were reacted with 1600 g of 64% $H_2SO_4$ in a continuously mixed beaker at a temperature of 45° C. for 35 minutes. This mixture was then quenched with about 5 L of room temperature de-ionized (DI) water to make-up to a total of 6.0 L. The suspension was then allowed to settle for several hours. Once a clean supernatant layer was obtained it was decanted off, and DI water added again to make back up to 6.0 L. The settle, decant, re-dilute procedure was repeated 8 times until the suspension no longer settled significantly. At this point the free sulfate concentration s measured by ion chromatograph was 90 mM, the pH was about 1.2 and the conductivity was about 43 mS/cm. All of the electrodialysis experiments were performed using samples of this solution as their starting feed material. The solids suspension concentration was estimated to be about 6,000 to 8,000 mg/L based on normally achieved yields using this procedure.

In order to determine the feasibility of using electrodialysis to remove acid from the composition, tests were performed utilizing different membrane technology and cell configurations in order to achieve several different final end states as indicated by conductivity, pH and free sulfate concentration. These included tests utilizing cell configurations incorporating cation/anion exchange membranes and bipolar/anion exchange membranes. Initially an open cell configuration was utilized due to fears of pluggage and fouling caused by the presence of high levels of suspended solids; however, when these were not found to be problematic the system was also tested with the addition of anion exchange resin to the feed compartment. Tests were also performed where the sulfuric acid in the receiving compartment was neutralized in order to decrease the amount of proton back migration.

The experiments on the cellulose solution were performed in a Microcell (Electrocell AB) with five pairs of membranes. Each cell has a surface area of 10 $cm^2$ for a total of active area of 50 $cm^2$. Each experiment was run with 0.1 M sulfuric, acid in the receiving compartment and 50 mM sulfuric acid in the rinse compartment. Solutions in each of the compartments were recirculated through the cell by peristaltic pumps and samples taken periodically throughout the batch conversion. Samples were analyzed for sulfate by ion chromatography and titrated for acid content. All experiments were performed at 40° C.; however, the method is applicable to other temperatures so long as the membranes, electrodes and other materials are suitably chosen.

Platinum probes were installed inside two of the feed compartments near the end membranes such that there were four complete working cells between the two probes. The experiment was run such that the power supply controlled a voltage between the two platinum probes as described below.

Example 1—Cation/Anion Cell Configuration

In a first experiment, an open cell configuration was utilized due to the fear of solids pluggage in the cell and potential fouling of the membrane. This test cell incorporated Neosepta CMX cation and Asahi AAV anion membranes. C, A respectively, as illustrated schematically in FIG. 7, showing 2 cells. The AAV membrane A is a specialty membrane developed to help prevent proton back-migration. In the FIG. 7 configuration, the sulfate travels across the anion membrane. This removes the sulfate from the feed solution, which then combines with the proton crossing the cation membrane to increase the acid strength in the receiving compartment. The cell was charged at a constant 3.2 V across the platinum wire probes (four cation and four anion membranes).

Figure 8:
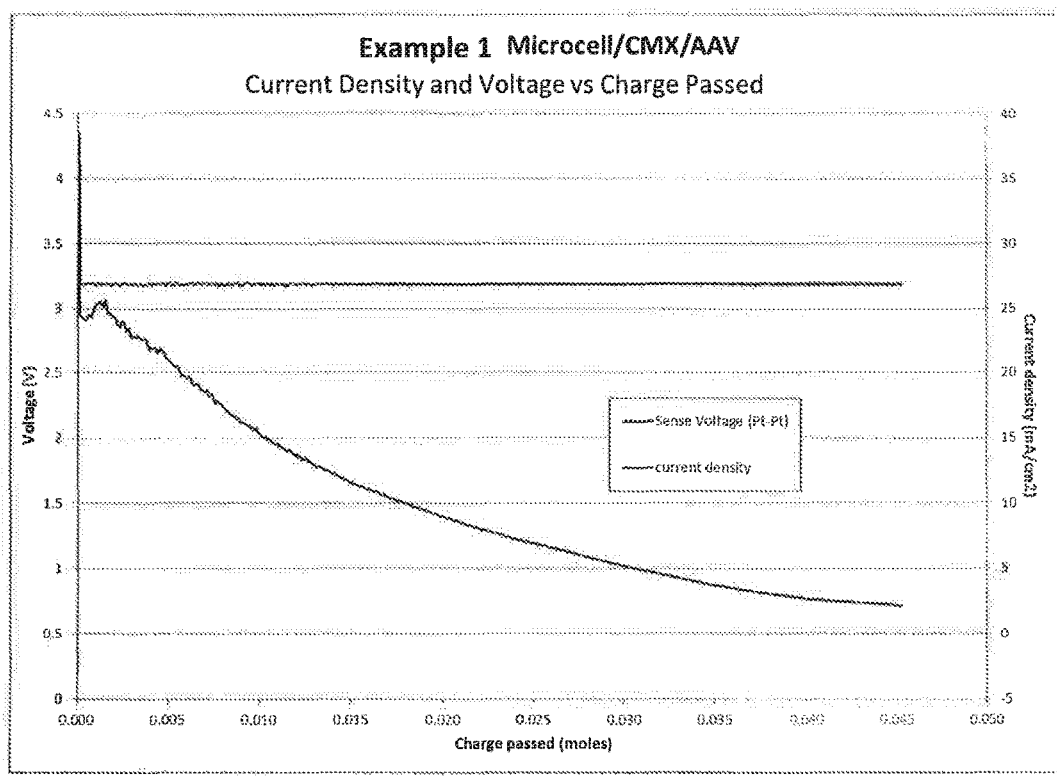
FIG. 8 is a graph of the current density and voltage versus charge passed for the experiment of Example 1.
Figure 9:
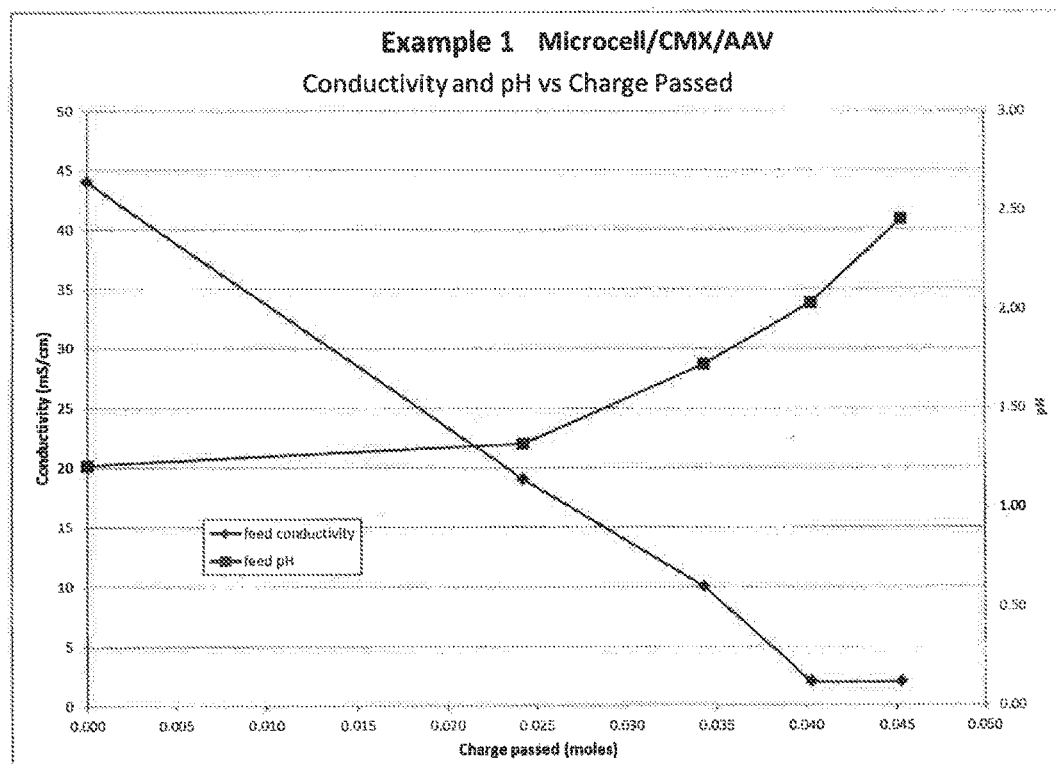
FIG. 9 is a graph of the conductivity and pH versus charge passed for the experiment of Example 1.
Figure 10:
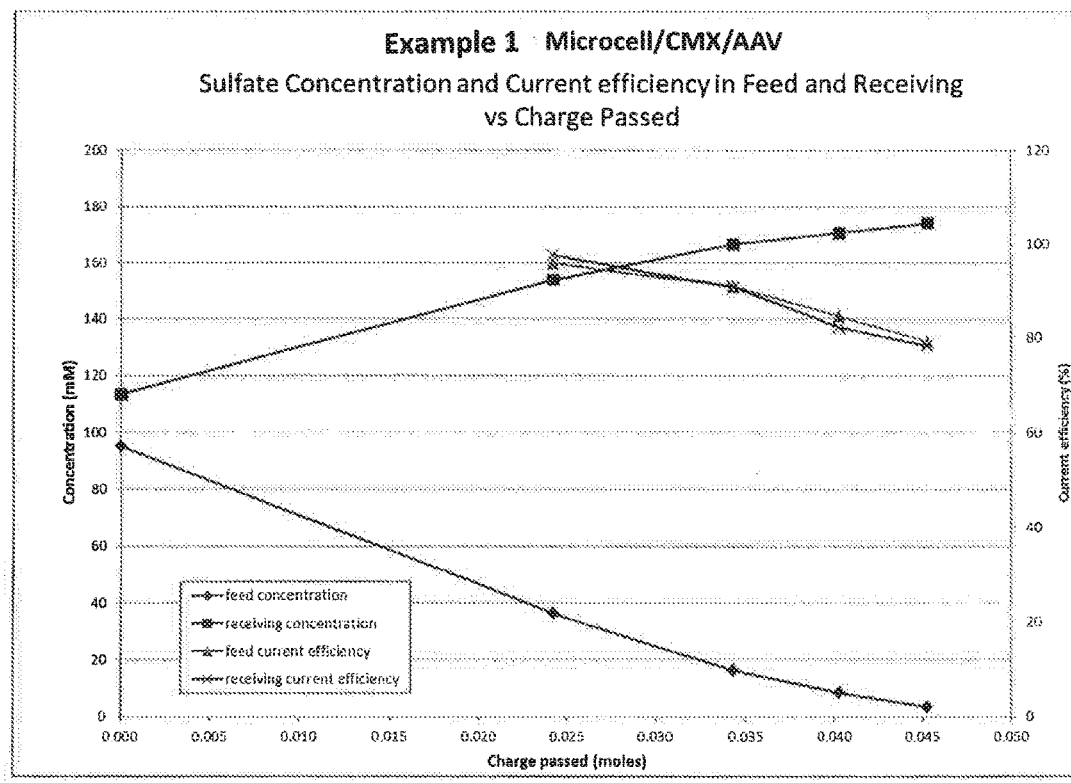
FIG. 10 is a graph of the sulfate concentration and current efficiency in the feed and receiving solutions versus the charge passed for the experiment of Example 1.

FIG. 8 shows the voltage and current density throughout the run. Although a relatively high current density of 25 mA/cm$^2$ was first obtained, it decreased considerably to about 2 mA/cm$^2$ by the end of the experiment. Overall an average current density 5.9 mA/cm$^2$ was obtained. FIG. 9 shows the conductivity and pH of the feed solution. The conductivity decreases steadily over the course of the run to 2 mS/cm and the also increased to a value of 2.5. FIG. 10 shows the feed and receiving sulfate concentrations and the calculated current efficiencies. The sulfate concentration in the feed decreased steadily over the whole run with a final sulfate concentration for the CMX/AAV cell configuration of 3.5 mM. The overall current efficiency was 79%, with very good correlation between feed and receiving current efficiencies. The current efficiency dropped throughout the run as the feed was depleted and the acid concentration increased in the receiving compartment. Although only 0.18 M sulfuric acid was obtained, it is predicted that the low concentration of sulfate in the feed increases the voltage drop on the AAV membrane significantly which may increase the amount of proton back migration. Although the target conductivity and pH were met, the sulfate level was about 10 times higher than the amount predicted at these levels, which may be due to the solids content of this solution. After the experiment the cell was disassembled and examined for signs of solids pluggage and membrane fouling; surprisingly no visible signs of solids deposition were observed in this, or any subsequent experiments.

Example 2—Bipolar/Anion Cell Configuration

In a second experiment, the CMX membrane in the Example 1 cell was replaced by a Neosepta BP-1E bipolar membrane B, as depicted in FIG. 11. This bipolar membrane splits water at low voltage to produce protons on the cathode facing side of the membrane and hydroxide on the anode facing side. In this case the proton in the cellulose solution does not need to be free but is "titrated" by hydroxide produced at the membrane surface. The sulfate is transported similarly to the Example 1 configuration. The bipolar membrane needs to run at a voltage of at least 1 V, and therefore a voltage of 1.4 V/cell was used (Pt-Pt voltage of 5.6 V over the four bipolar and four anion membranes).

Figure 12:
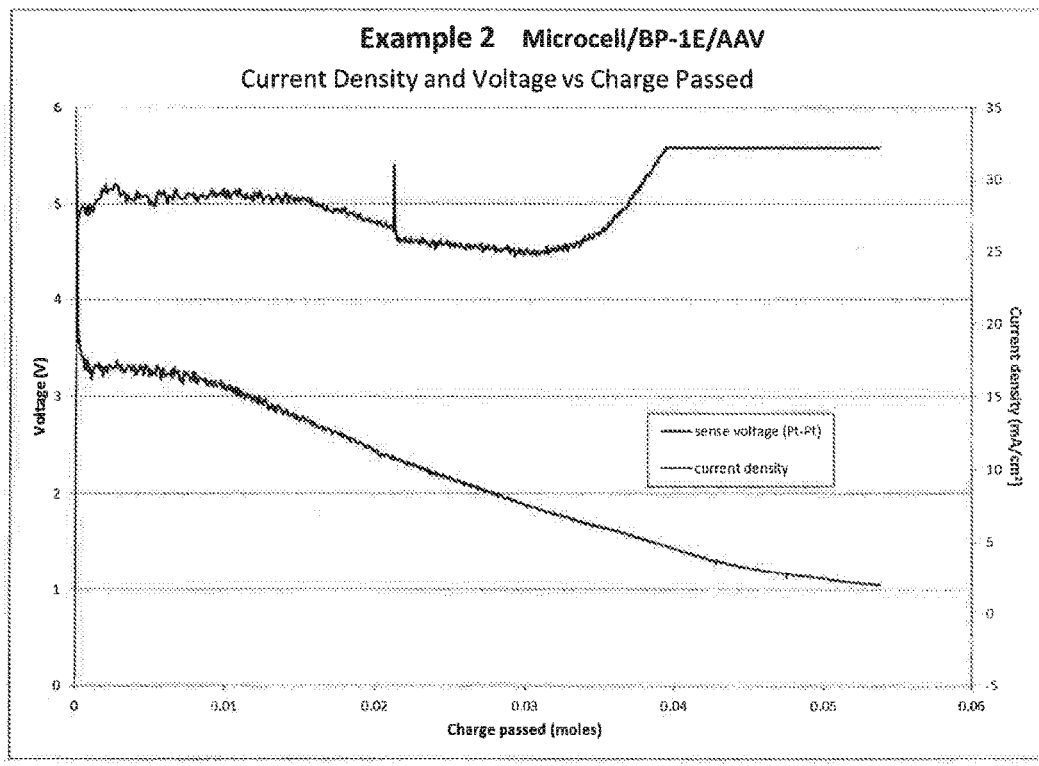
FIG. 12 is a graph of the current density and voltage versus charge passed for the experiment of Example 2.

The power supply used for these tests had a voltage limit of 10 V, which initially limited the Pt-Pt voltage as the end voltages were high (5 volts total). FIG. 12 shows the voltage and current density profiles. As the current density dropped so did the end voltages. At about 0.04 moles of charge, the end voltages dropped below 4.4 V and this allowed the cell to reach 5.6 V between platinum probes. This cell ran at an average current density of 6.0 mA/cm$^2$.

Figure 13:
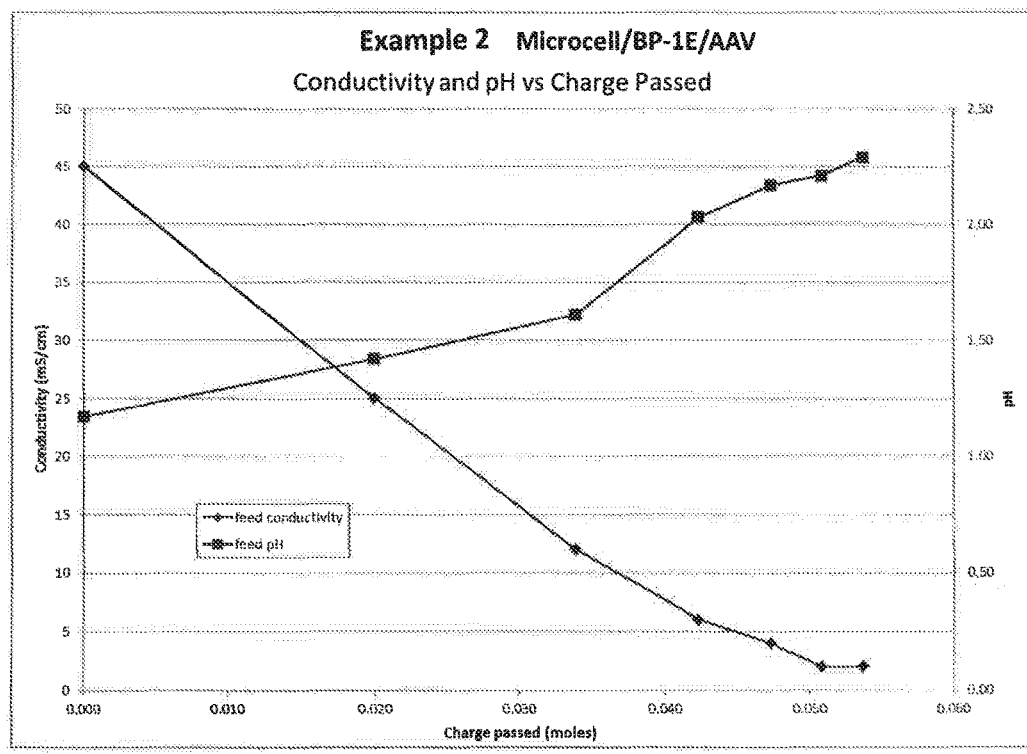
FIG. 13 is a graph of the conductivity and pH versus charge passed for the experiment of Example 2.
Figure 14:
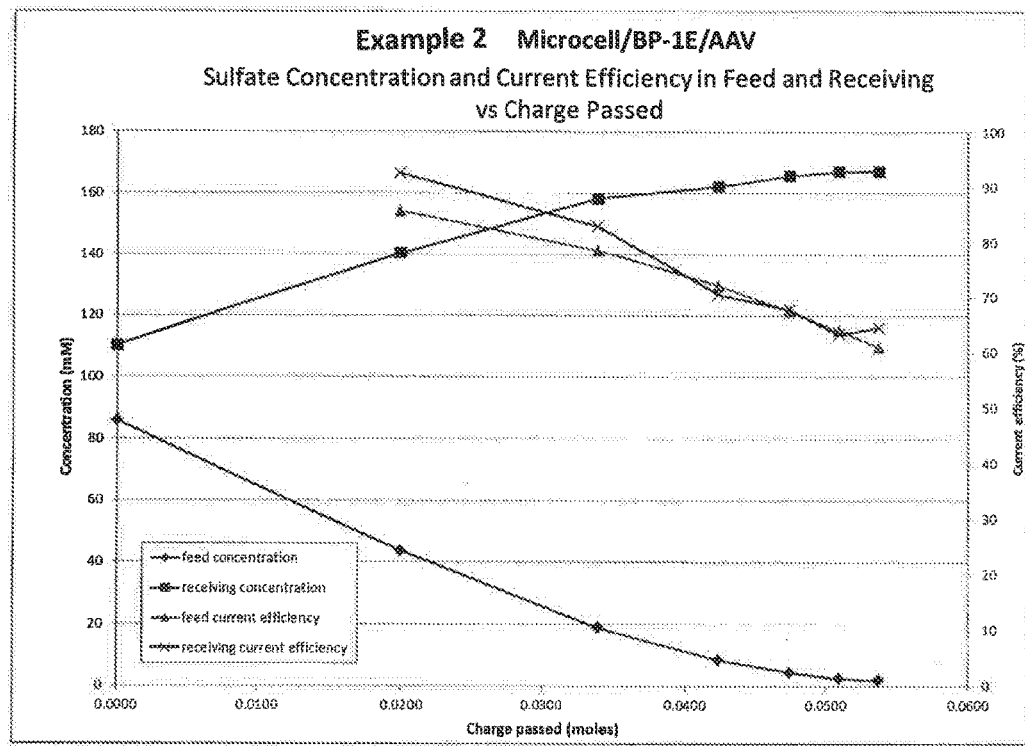
FIG. 14 is a graph of the sulfate concentration and current efficiency in the feed and receiving solutions versus charge passed for the experiment of Example 2.

FIGS. 13 and 14 show the feed pH, conductivity and sulfate concentrations obtained in this run. An end feed conductivity of 2 mS/cm was again obtained at a slightly lower pH (2.35). More charge was passed than with the CMX membrane and the final feed sulfate concentration was lower as well at 1.9 mM. The overall current efficiency for this run was also lower at 61%. The lower current efficiency is believed due to a longer run time with part of the run at lower sulfate concentration. The current efficiency after the same amount of charge in Example 1 (0.045 mol) was 70% and dropping considerably during the last few samples. The lower current efficiency for these last samples again suggests that proton back migration increases as the sulfate level reaches low levels.

Example 3—Bipolar/Anion Cell Configuration with Anion Exchange Resin

Figure 15:
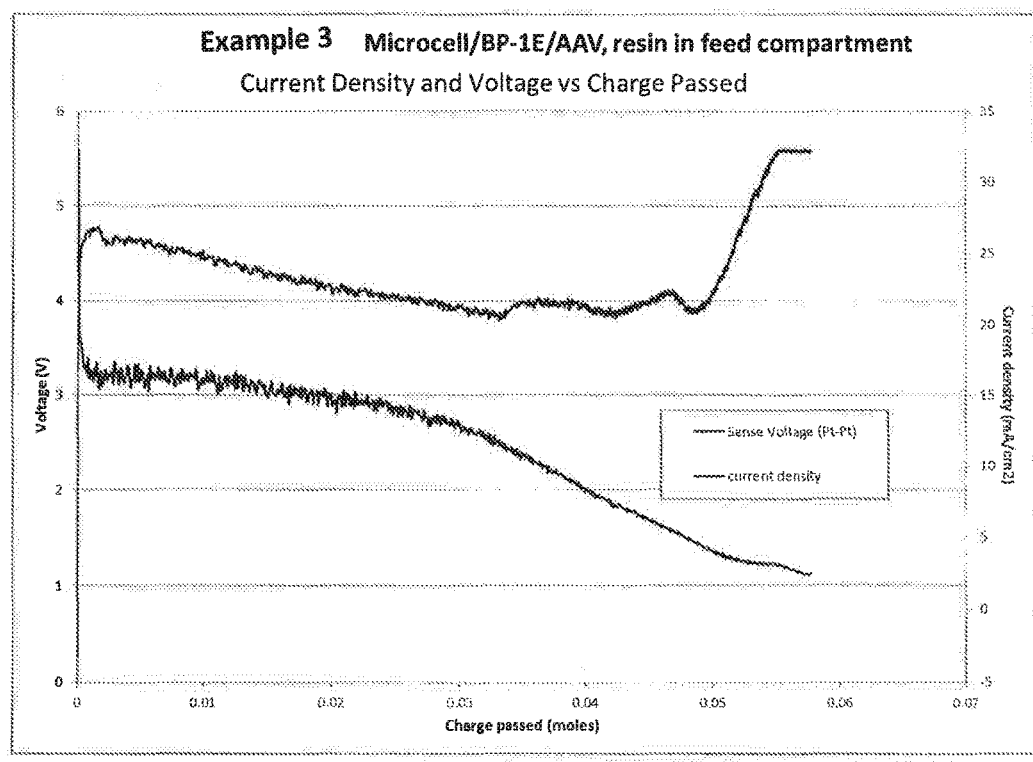
FIG. 15 is a graph of the current density and voltage versus charge passed for the experiment of Example 3.

Given that solids pluggage and fouling was not observed in the open cell configuration a subsequent experiment was performed using a similar cell build, but with the feed compartment filled with an anion exchange resin (Supelco Amberlite IRA400). The use of ion exchange resin in this compartment was intended to boost the solution conductivity and help facilitate the transfer of sulfate in this compartment by increasing the local concentration of anion (sulfate). The resin was first converted to the hydroxide form by soaking in NaOH and rinsed with DI water before being added to the cell. The cell was built with BP-1E bipolar and AAV anion membranes in the same configuration as FIG. 11. The active area of the feed flow frames were filled with the resin and the inlet and outlet channels of the frames were filled with glass wool to retain the resin within the cell. As with the Example 2 test with bipolar membrane, the total cell voltage again was limited and the run did not reach 5.6 V between the platinum probes until 0.055 moles of charge has passed as shown in FIG. 15. An average current density of 8.2 mA/cm$^2$ was obtained.

Figure 16:
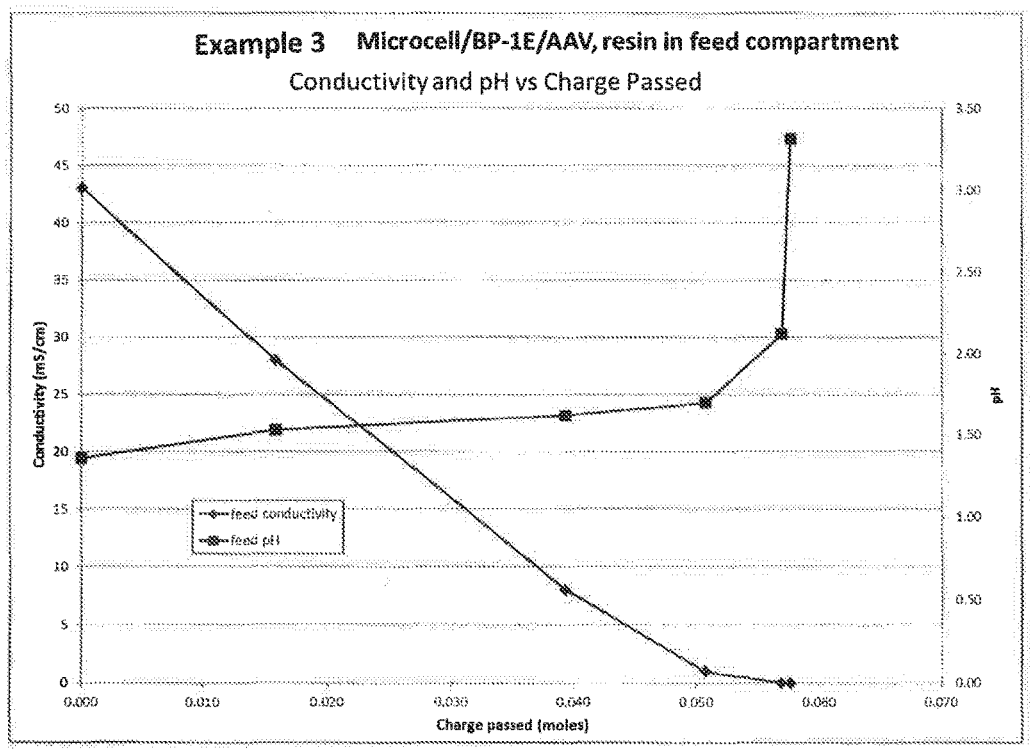
FIG. 16 is a graph of the conductivity and pH versus charge passed for the experiment of Example 3.
Figure 17:
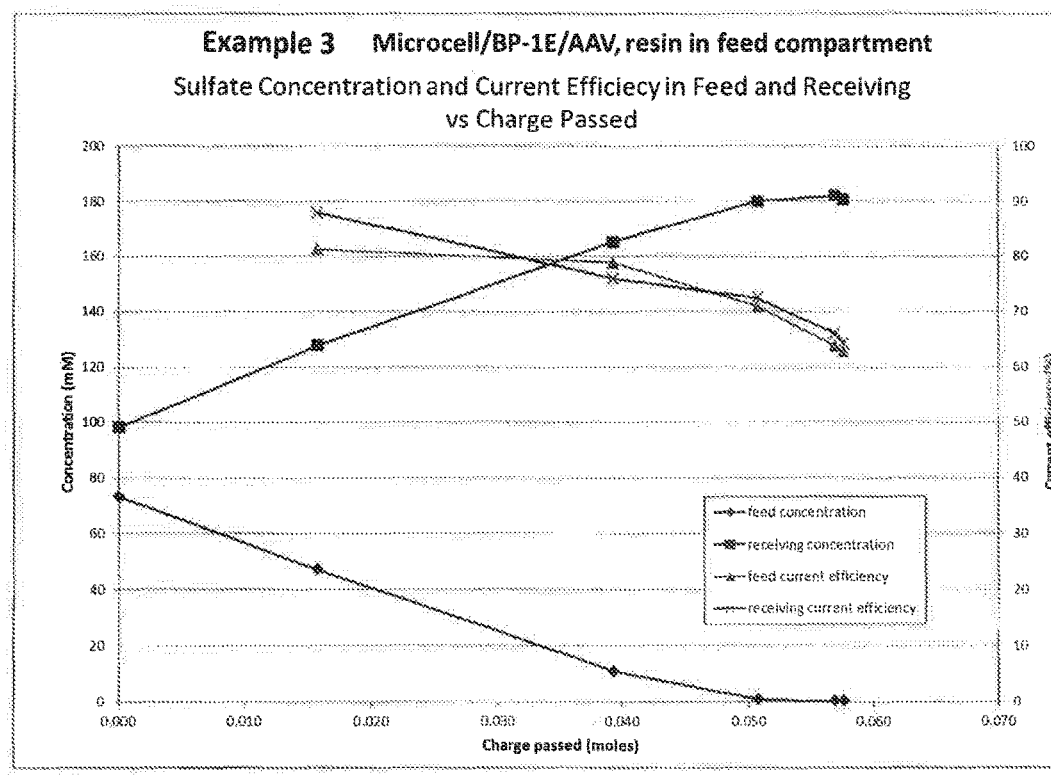
FIG. 17 is a graph of the sulfate concentration and current efficiency in the feed and receiving solutions versus charge passed for the experiment of Example 3.

FIGS. 16 and 17 show the feed pH, conductivity and sulfate concentrations obtained for this run. The conductivity dropped below the measurement range of the instrument indicating a value of less than 0.5 mS/cm. The feed pH also increased substantially at the very end of the run reaching a value of about 3.3. The values corresponded to a feed solution with a sulfate concentration of 0.3 mM (the sulfate target); however, in order to obtain this value a lower conductivity and a higher pH was required. The current efficiency was again lower at 63%, about the same as the Example 2 cell build without the resin. This experiment achieved the highest average current density (8.2 mA/cm$^2$) and current efficiency (63%) for a dilute acid receiving fluid run. This was achieved while also producing the lowest final free sulfate concentration (0.3 mM) by a wide margin, which increases the significance of the results since both the current density and current efficiency decrease rapidly toward the end of the run as the final free sulfate concentration decreases to very low levels.

Figure 18:
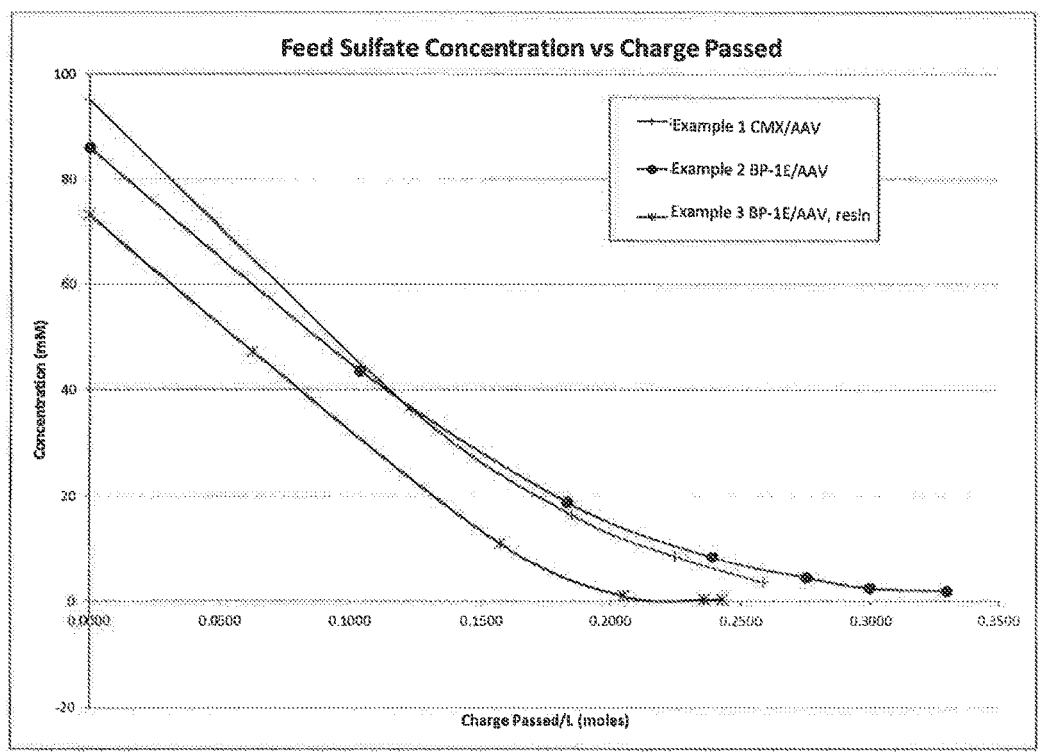
FIG. 18 is a graph of the feed sulfate concentration versus charge passed in the experiments of Examples 1, 2 and 3.

FIG. 18 compares the Example 1, 2 and 3 experiments. Overall the electrodialysis was very effective in removing the sulfate from the cellulose solution and no signs of solids pluggage or membrane fouling were observed. By adding the resin in the feed compartment, virtually the entire amount of sulfate was removed. The resin initially removed some sulfate at the beginning of the experiment so that less charge was passed. This is due to the resin starting in the basic form, which would not be the case if a second batch was performed. The resin allowed complete removal of the sulfate at higher current density than the other runs.

Examples 4 and 5

Cation/Anion Cell Configuration with Added Base

An experiment was performed on a cell with CMX and AAV membranes using a sodium sulfate receiving solution (Example 4) to elucidate the cause of the loss of current efficiency. Sodium hydroxide was added to the receiving side to keep the pH above 2.5. For comparison, an experiment was also performed on the same cell without the sodium hydroxide addition (Example 5). The Example 4 configuration ran at a lower average current density (6.1 mA/cm$^2$) than the same cell build (Example 5) with a sulfuric acid receiving solution (7.9 mA/cm$^2$). The reduction in current density is believed to be due to the lower conductivity of a receiving salt solution compared to a dilute acid solution with a similar sulfate concentration. The pH of the receiving solution was maintained above the pKa of bisulfate to produce a very low proton concentration and minimize back migration Example 4 had an average current efficiency of approximately 100%, compared to about 60% for the Example 5 run. The difference between example 4 and 5 was the reduction of proton concentration in the receiving cell by the addition of caustic. This indicates that the current efficiency is reduced primarily by proton back migration across the AAV membrane.

A summary of the final and averaged results of these experiments is shown in the following Table 1.

TABLE 1

| Example | Run Time (hr) | Cell Configuration | Average CD (mA/cm$^2$) | moles of charge passed | End Feed Sulfate conc. (mM) | Conductivity (mS/cm) | pH | Feed Current Efficiency (%) |
|---|---|---|---|---|---|---|---|---|
| 1 | 4.2 | CMX/AVV | 5.9 | 0.045 | 3.5 | 2 | 2.45 | 79 |
| 2 | 4.8 | BP-IE/AAV | 6.0 | 0.054 | 1.9 | 2 | 2.29 | 61 |
| 3 | 3.8 | BP-IE/AAV/resin | 8.2 | 0.058 | 0.3 | 0 | 3.31 | 63 |
| 4 | 3.5 | CMX/AAV | 6.1 | 0.039 | 20.5 | 6 | 3.18 | 102 |
| 5 | 5.0 | CMX/AAV | 7.9 | 0.074 | 7.4 | 7 | 2.45 | 60 |

No signs of solids pluggage or membrane fouling were observed in any experiments despite predictions to the contrary based on information in the literature. As Table 1 shows, it was possible to decrease the sulfate concentration to below 2 mM using an open cell configuration. It was possible to further decrease the sulfate concentration to 0.3 mM in an electrodialysis cell with anion exchange resin located in the feed compartment chamber. Reduced current efficiency due to high proton back-migration could be significantly reduced due to the addition of base in the receiving fluid.

It is apparent from the experiments that in the multistage electrodialysis process 80 (as in FIG. 6), the free sulfate concentration could be reduced in the first step 30 of electrodialysis from 90 mM to 16 mM (about 82% removal) in a back mixed unit with an acidic receiving fluid (to allow re-use of the recovered acid) with an estimated current efficiency of about 72% and current density of about 40 mA/cm$^2$. The partially purified partly-hydrolyzed cellulose suspension is then further purified in the second step 82 of electrodialysis (e.g. to about 0.3 mM) in a configuration utilizing an anion exchange resin in the feed compartment and with base added to the receiving fluid, to produce a neutral salt, minimize proton back migration and achieve a higher current efficiency (about 90%) at an average current density of about 25 mA/cm$^2$. Such a split reduces the area requirements for the more expensive cell configuration by several fold, while at the same time reducing the base usage and acid make-up requirements by about 80%. Optionally, the first stage 30 may be operated as a batch or plug flow purification to reduce its size and power consumption by approximately half. Also optionally, more stages of electrodialysis could be used, as the greater the number of stages the smaller the impact of using continuously back mixed units as opposed to batch or plug flow ones. Optionally, any of the stages of electrodialysis may utilize either a dilute acid or partially neutralized feed or receiving solution; it is not necessary for these to be the same.

Example 6

Prepare partly hydrolyzed cellulose using cellulose and acid. Purify the product by reducing the residual acid to low levels. It is not sufficient to simply neutralize the residual acid, as the level of all free ions must be reduced to low levels. All of the experimental examples given above demonstrate the removal of residual acid from the partly hydrolyzed cellulose product which represents the simplest case. In this Example 6, add a base, such as sodium hydroxide, to the feed, in or upstream of, the electrodialysis system to neutralize some, or all, of the free acid. The cations associated with the added base, e.g. Na+ in the case of caustic, replace protons being removed from the feed solution. Since cations other than protons are being removed, a cation membrane is required, rather than a hi-polar membrane. As with previous examples, the free anions in the feed are removed across an anion membrane. These anions then recombine with the cations from the base and any remaining free protons, removed across the cation membrane.

A reduction in current density was observed in Example 4 above, which is believed to be due to the reduction in receiving solution conductivity when neutralized. A further reduction in current density is anticipated when the feed is neutralized, given that both feed and receiving fluids would then have reduced solution conductivities.

Example 7

A hi-polar membrane is added between the cation and anion membranes of the receiving fluid in Example 6 in order to regenerate both the original acid and the original base. In this case, protons generated at the bi-polar membrane surface recombine with removed anions to regenerate the original acid. The hydroxide formed on the other bi-polar membrane surface combines with the removed cation, regenerating the base used for feed neutralization.

A dilution based dialysis system's capacity, flows and cost are roughly proportional to the logarithm of the percentage removal rate required regardless of the absolute concentration or removal. Thus, either the first, second or last 10-fold reduction in acid to partly-hydrolyzed cellulose ratio each require about 113 the dialysis capacity required to achieve a total 1,000-fold reduction. In contrast, the sizing and membrane area requirements and cost of the present electrodialysis based purification system have been shown to be much more closely related to the actual quantity of ions removed. For the electrodialysis based removal system, the first 10-fold reduction might represent approximately 90% of the cost, compared to only 10%, for the remaining 100 times reduction. Because of this more direct relationship, the electrodialysis purification system has been found to be particularly well suited toward the final purification of partly-hydrolyzed cellulose where free ion concentrations are already low in absolute terms, but large percentage removal rates are still required. Significant capital, time, water usage and operating cost reductions may be realized through the appropriate use of the electrodialysis purification system; however, in some cases, the optimal overall system configuration may include some dilution dialysis based removal upstream.

As will be apparent to those skilled in the art in light of the foregoing disclosure, many alterations and modifications are possible in the practice of this invention without departing from the scope thereof. Accordingly, the scope of the invention is to be construed in accordance with the following claims.

The invention claimed is:

1. A method of recovering purified partly-hydrolyzed cellulose particles from a composition comprising agglomerated partly-hydrolyzed cellulose particles and free ions, comprising the step of electrodialysis of the composition to produce a stream comprising purified partly-hydrolyzed cellulose particles.

2. A method according to claim 1, wherein the free ions comprise an acid.

3. A method according to claim 2, wherein the acid comprises sulfuric acid.

4. A method according to claim 2, wherein the acid comprises one of sulfuric acid, hydrochloric acid, nitric acid and phosphoric acid, and mixtures thereof.

5. A method according to claim 1, further comprising pre-treatment of the composition before the electrodialysis to reduce the concentration of the free ions.

6. A method according to claim 5, wherein the free ions comprise an acid.

7. A method according to claim 5, wherein the pre-treatment comprises diluting the composition with a fluid comprising water.

8. A method according to claim 5, wherein the pre-treatment comprises diluting the composition with a fluid comprising water and concentrating the diluted composition.

9. A method according to claim 8, wherein the concentrating is done by centrifuging or settling.

10. A method according to claim 9, wherein the centrifuging or settling is done multiple times.

11. A method according to claim 5, wherein the pre-treatment comprises diluting the composition with a fluid comprising water, concentrating the diluted composition, and dialysis of the concentrated composition.

12. A method according to claim 11, wherein the steps of diluting and concentrating are done two or more times.

13. A method according to claim 5, wherein the pre-treatment comprises diluting the composition with a fluid comprising water, then concentrating the diluted composition, then diluting the concentrated composition, and then dialysis of the diluted composition.

14. A method according to claim 1, further comprising adding a base to the composition prior to the electrodialysis.

15. A method according to claim 1, further comprising adding a base to a receiving solution of an electrodialysis cell prior to the electrodialysis.

16. A method according to claim 1, wherein the electrodialysis is done using an electrodialysis cell with a cation-anion membrane cell configuration.

17. A method according to claim 16, further comprising adding a base to a feed compartment in the electrodialysis cell.

18. A method according to claim 1, wherein the electrodialysis is done using an electrodialysis cell with a bipolar-anion membrane cell configuration.

19. A method according to claim 1, wherein the electrodialysis is done using an electrodialysis cell with a cation-bipolar-anion membrane cell configuration.

20. A method according to claim 1, wherein, during the electrodialysis, an anion exchange resin is present in a feed compartment of the electrodialysis cell.

21. A method according to claim 1, further comprising adding a base to an anion receiving solution in the electrodialysis cell.

22. A method according to claim 1, further comprising, after the step of electrodialysis, a second step of electrodialysis of the stream of purified partly-hydrolyzed cellulose particles.

23. A method according to claim 1, wherein the composition has a suspended solids level greater than 1,000 mg/L.

24. A method according to claim 1, wherein the composition has a suspended solids level greater than 6,000 mg/L.

* * * * *